United States Patent
Kubicko

(12) 
(10) Patent No.: US 6,364,226 B1
(45) Date of Patent: Apr. 2, 2002

(54) FOOD PROCESSOR WITH REVERSIBLE MOTOR FEATURE

(75) Inventor: Robert Kubicko, Southbury, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/562,409

(22) Filed: May 1, 2000

(51) Int. Cl.⁷ ............................ B02C 11/08; B02C 23/06
(52) U.S. Cl. .................... 241/36; 241/282.1; 241/292.1
(58) Field of Search ................... 241/33, 36, 278.1, 241/282.1, 282.2, 292.1

(56) References Cited

U.S. PATENT DOCUMENTS

| | | | |
|---|---|---|---|
| 3,892,365 A | 7/1975 | Verdun | 241/92 |
| 4,113,188 A * | 9/1978 | Bleinkoff | 241/37.5 |
| D251,407 S | 3/1979 | Tsuji et al. | D7/153 |
| 4,198,112 A * | 4/1980 | McLean | 241/92 |
| D258,109 S | 2/1981 | Fukumoto et al. | D7/153 |
| D259,992 S | 7/1981 | Kahicke | D7/160 |
| D261,718 S | 11/1981 | Harrison | D7/153 |
| 4,516,733 A | 5/1985 | Funagura et al. | 241/79 |
| 4,634,061 A * | 1/1987 | Williams | 241/101 R |
| D290,676 S | 7/1987 | Stutzer et al. | D7/384 |
| 4,691,870 A | 9/1987 | Fukunaga et al. | 241/36 |
| 4,714,203 A | 12/1987 | Williams | 241/36 |
| 4,723,719 A * | 2/1988 | Williams | 241/282.2 |
| D296,860 S | 7/1988 | Maass | D7/384 |
| D296,976 S | 8/1988 | Maass | D7/384 |
| D298,204 S | 10/1988 | Mikami | D7/384 |
| 4,984,747 A * | 1/1991 | Lechner | 241/55 |
| D324,322 S | 3/1992 | Barrault | D7/384 |
| D325,322 S | 4/1992 | Maass | D7/384 |
| D335,065 A | 4/1993 | Gildersleeve | D7/384 |
| 5,222,430 A | 6/1993 | Wang | 99/512 |
| D390,413 S | 2/1998 | Hippen et al. | D7/384 |
| D390,746 S | 2/1998 | Hippen et al. | D7/384 |
| 5,819,636 A * | 10/1998 | Khashoggi | 99/326 |
| 5,845,991 A * | 12/1998 | Sundquist | 366/206 |
| 5,852,968 A * | 12/1998 | Sundquist | 99/492 |
| D410,816 S | 6/1999 | Crescenzi et al. | D7/384 |
| D421,201 S | 2/2000 | Crescenzi et al. | D7/412 |
| D421,363 S | 3/2000 | Crescenzi et al. | D7/384 |

FOREIGN PATENT DOCUMENTS

DE  3527772 * 2/1987 ........... B02C/18/18

* cited by examiner

*Primary Examiner*—Ed Tolan
(74) *Attorney, Agent, or Firm*—Ohlandt, Greeley, Ruggiero & Perle, LLP

(57) ABSTRACT

There is provided a food processor having a motor, an impeller rotatably driven by the motor, a controller for rotating the motor in a first direction or a second direction, and a switch for controlling the controller to change the direction of the rotation of the motor.

21 Claims, 5 Drawing Sheets

FOOD PROCESSOR WITH REVERSIBLE MOTOR FEATURE

BACKGROUND OF THE INVENTION

1. Field Of The Invention

The present invention relates to food processors. More particularly, the present invention relates to food processors having a reversible motor and blade combination.

Food processors appliances typically include an electrical motor that drives an impeller with blades disposed in a container for processing food items. These food processors generally have the capability of operating in a number of different modes to process a variety of foods with various impellers and speeds appropriate for the specific food being processed and specific to the desired consistency of the processed food. For instance, foods may either be chopped by rotating an impeller having sharp blades or foods may be ground by rotating an impeller having blunt blades.

2. Description of the Prior Art

Prior art processors required that two impellers, one having sharp blades and one having dull blades. When it was desired to grind the food items in the processor, the user was required to install the impeller with blunt blades. Conversely, when it was desired to chop the food items in the processor, the user was required to install the impeller with sharp blades. Providing two impellers to the user was expensive and made the processor less convenient to use and store.

Other prior art devices resolved the problems presented by having two impellers by providing a single impeller with blades that were sharp on one side and blunt on the other. The impeller can be installed one of two ways, namely with either the sharp blades or the blunt blades contacting the food during rotation. Thus, the user must install the impeller in the desired direction. These dual purpose impellers, while removing the need for two different impellers, still require the user to physically remove, reverse and reinstall the impeller in order to switch between chopping and grinding.

SUMMARY OF THE INVENTION

It is an object of the present invention to provide a food processor having a reversible motor and a single impeller.

It is another object of the present invention to provide such a food processor in which the impeller has blades having a sharp side and a blunt side.

It is a further object of the present invention to provide such a food processor in which the reversible motor is capable of operating at various speeds in both directions to achieve the preferred food consistency during both chopping and grinding.

These and other objects of the present invention are achieve by a food processor having a motor, an impeller rotatably driven by the motor, a controller for rotating said motor in a first direction or a second direction, and means for switching said controller either in a first mode for rotating said motor in a first direction, or a second mode for rotating said motor in a second direction.

The present invention is further directed to a food processor having a food container disposed upon a motor housing. The motor housing has a motor and a controller disposed therein. The motor has a shaft, rotatably driven by the motor, that extends from the housing into the food container. The shaft has a free end that is adapted to removably receive a hub of an impeller. The impeller is adapted to rotate in response to the rotation of the shaft. The food processor also has means for switching the controller to rotate the motor in a either first direction or a second direction. Thus, the food processor enables both chopping and grinding without any changes of the impeller.

DETAILED DESCRIPTION OF THE INVENTION

Figure 1:
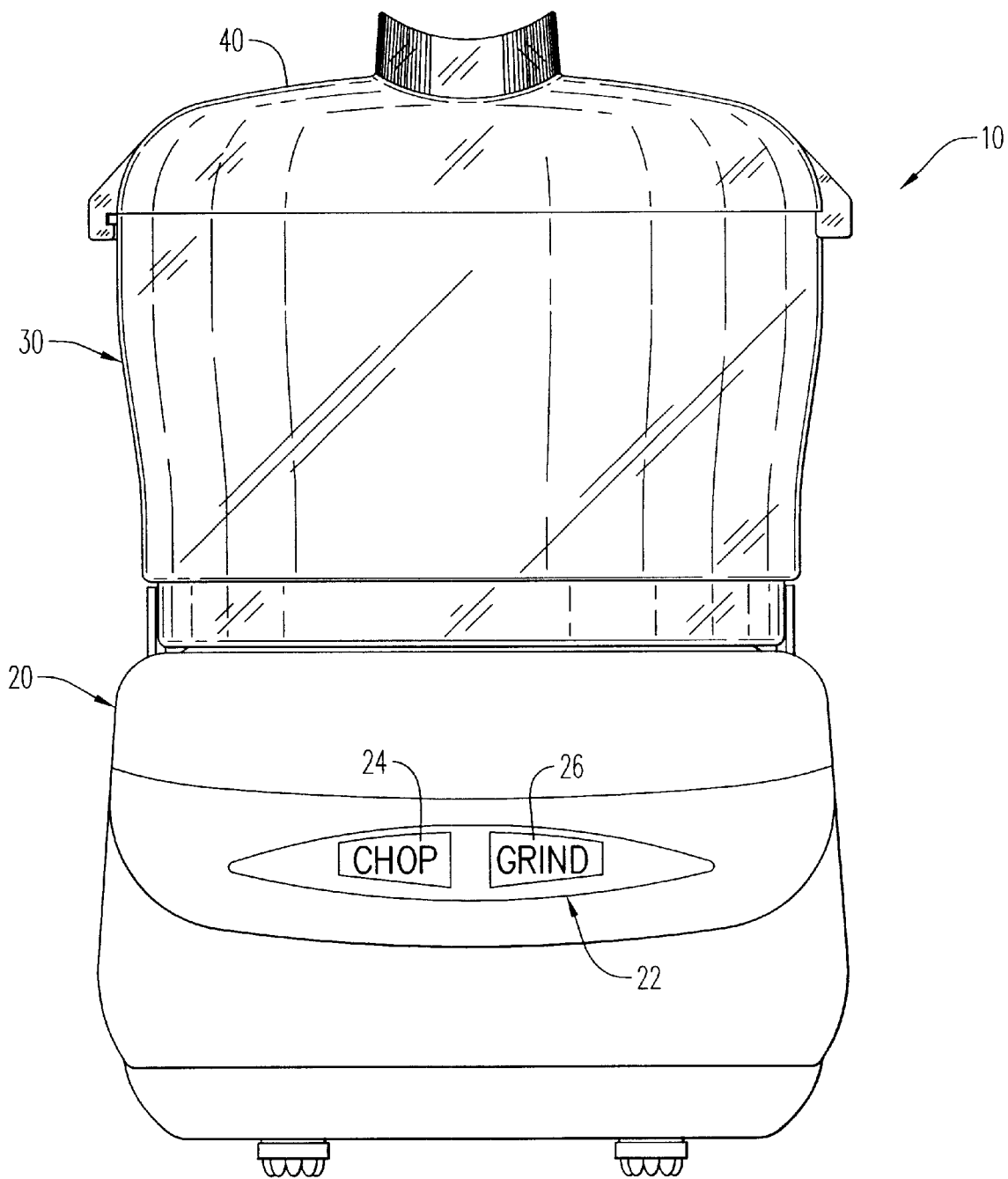
FIG. 1 is a front view of the food processor of the present invention.
Figure 2:
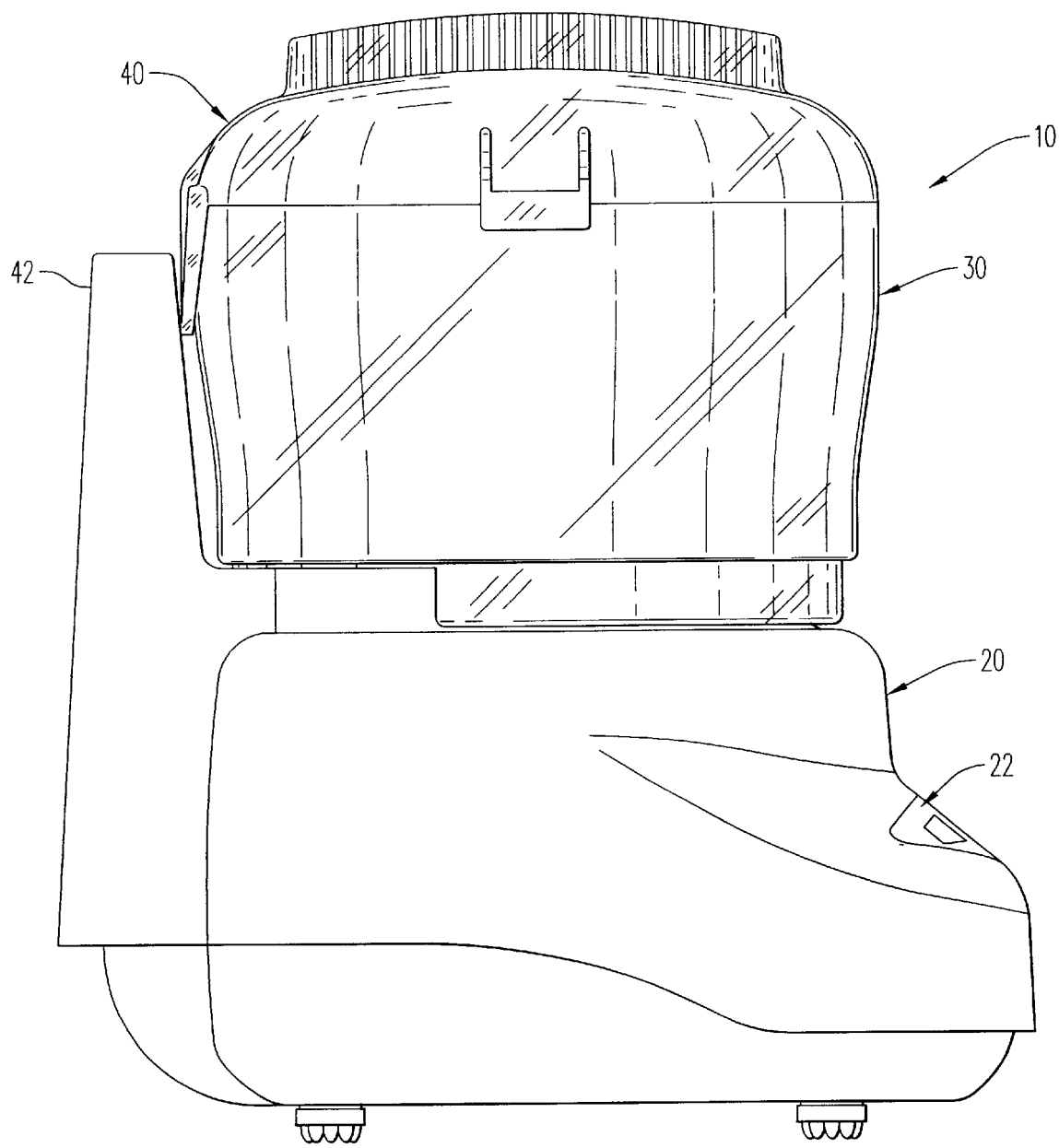
FIG. 2 is a side view of the food processor of FIG. 1.

Referring to the figures and, in particular, FIGS. 1 and 2, there is provided a food processor generally represented by reference numeral 10. The food processor 10 with a motor housing 20, a container 30 adapted to sit on the motor housing, and a lid 40 adapted to cover the container.

Motor housing 20 has a lid support 42 and a control panel 22 disposed thereon. Lid support 42 is adapted to receive lid 40 in a rotatable manner. Control panel 22 has at least a chop button 24 and a grind button 26. Food processor 10 is operable in at least two modes, chop and grind, to process food in container 30. Panel 22 may include other operator controls, such as an on/off switch, and further food processing modes, none of which are shown in FIG. 1. For example, in an alternate embodiment, control panel 22 further has a speed control switch 80, shown in FIG. 6. For example, speed control switch 80 may be, but is not limited to, a liner switch or rotary switch.

Figure 3:
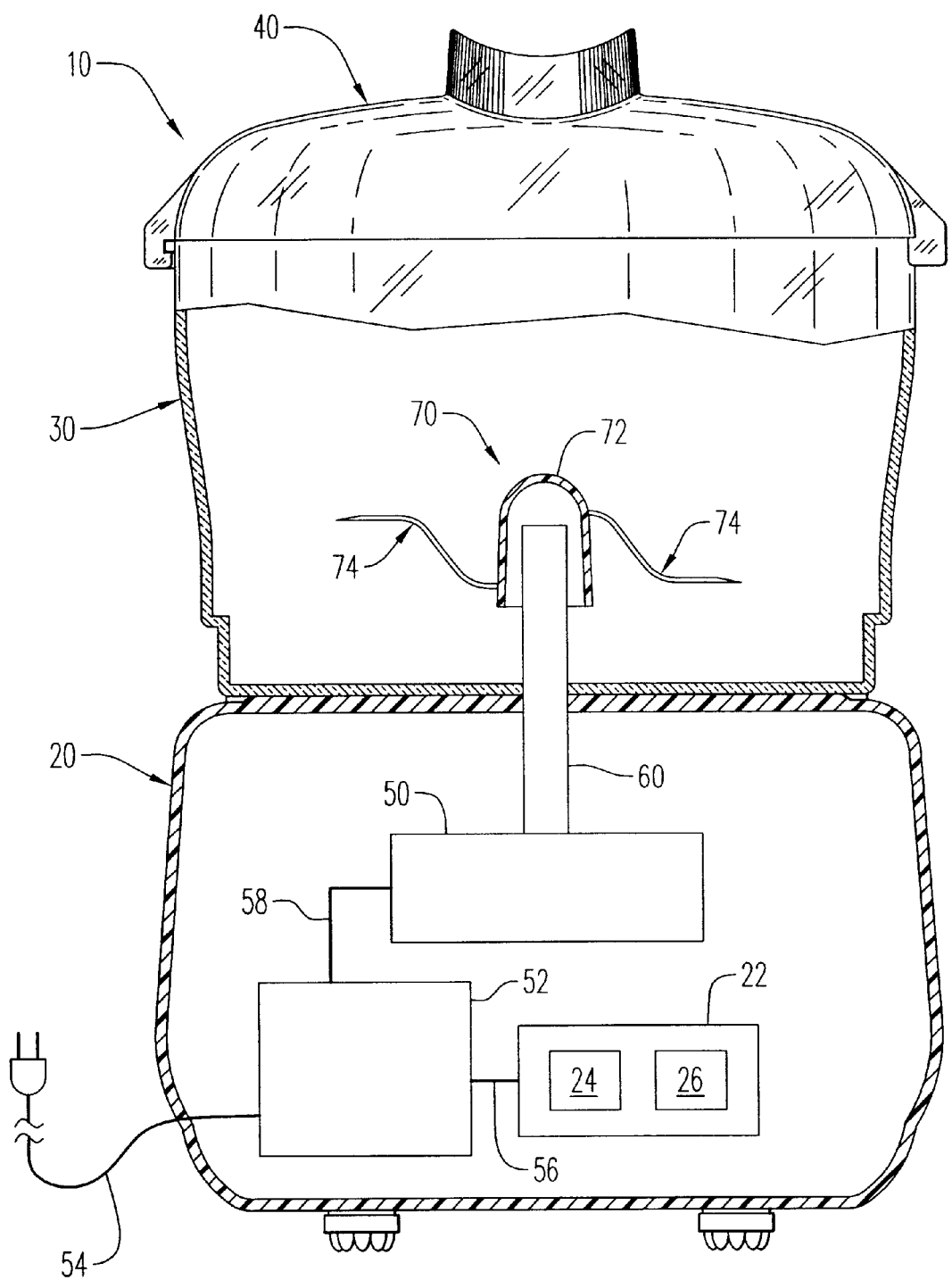
FIG. 3 is a cross sectional view of the food processor of FIG. 1.

Referring to FIG. 3, motor housing 20 has a motor 50 and a motor controller 52. Motor 50 is adapted to rotate a drive shaft 60, which extends from housing 20 into container 30. Shaft 60 is rotatably sealed within container 30 and is adapted to removably receive a hub 72 of a single impeller 70. Impeller 70 is adapted to rotate in response to the rotation of shaft 60 upon hub 72.

Figure 6:
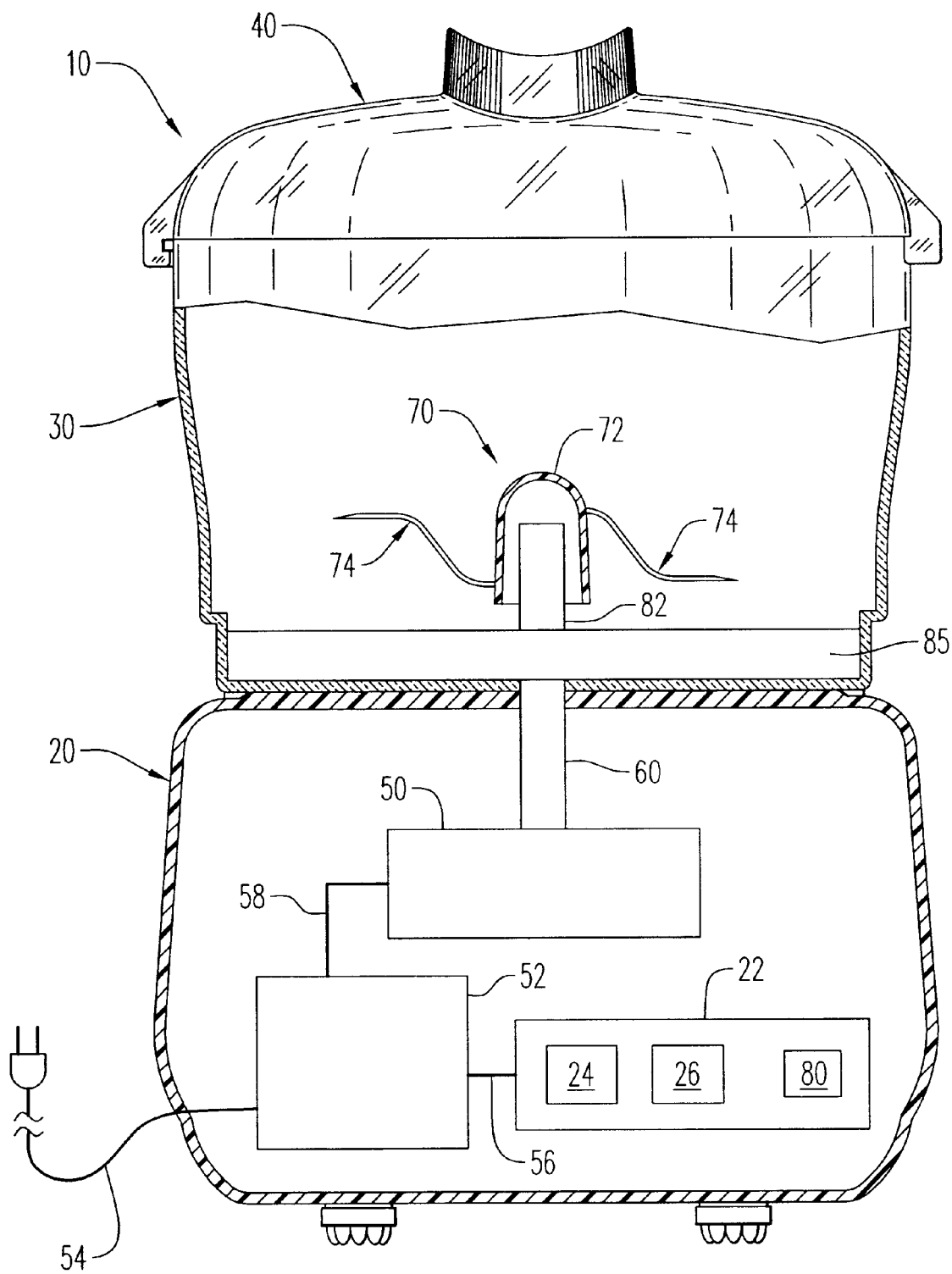
FIG. 6 is a cross sectional view of a second embodiment of the food processor of FIG. 1.

In an alternate embodiment, drive shaft 60 does not extend from housing 20 into container 30, shown in FIG. 6. Rather, shaft 60 extends from housing 20 into a sealed gear train 85, preferably a planetary gear train. Gear train 85 has an output shaft 82 that extends into container 30. Output shaft 82 is adapted to rotate in response to the rotation of drive shaft 60 by motor 50. Output shaft 82 is rotatably sealed within container 30 and is adapted to removably receive hub 72 of impeller 70. Thus, in this embodiment, impeller 70 is adapted to rotate in response to the rotation of output shaft 82 upon hub 72.

Figure 4:
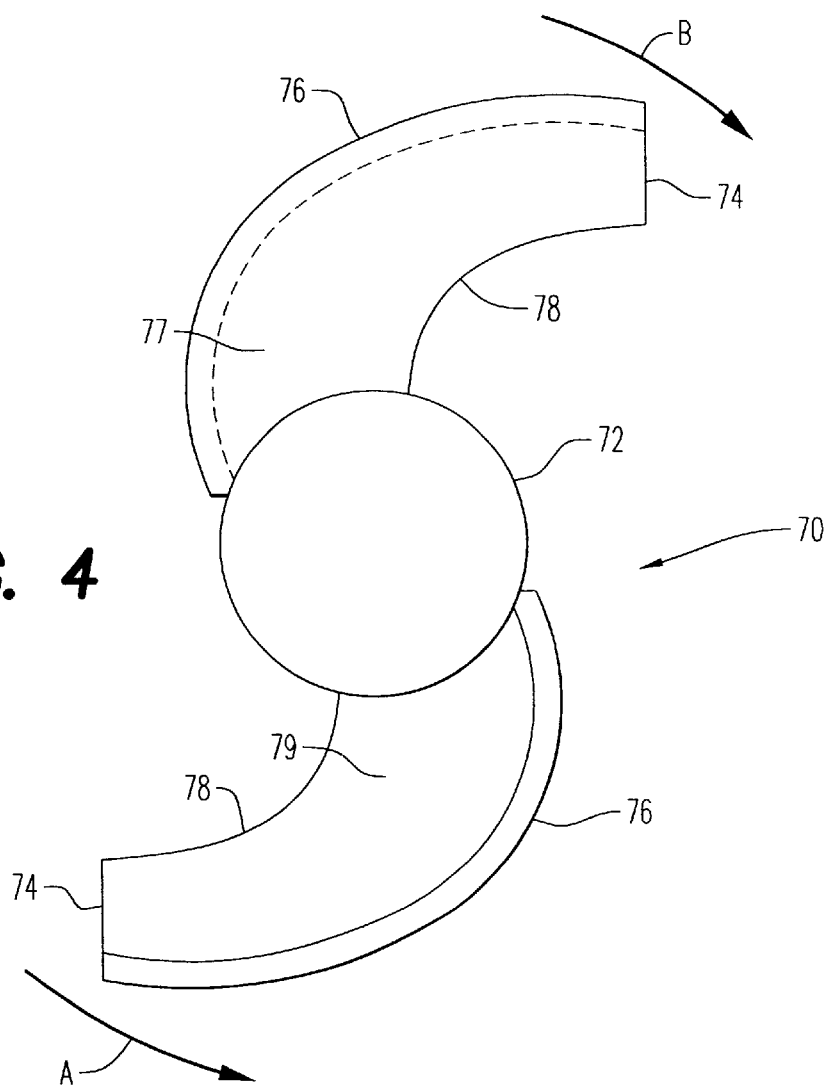
FIG. 4 is a top view of the impeller included in the food processor of FIG. 1.
Figure 5:
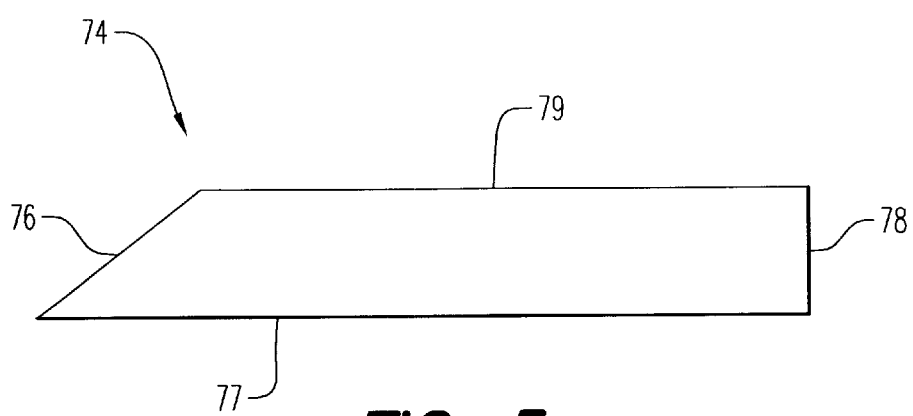
FIG. 5 is an end view of the blades of the impeller of FIG. 4.

Impeller 70, shown in FIGS. 3 and 4, preferably has two blades 74. It should be recognized that more or less than two blades may be used and are included within the scope of the present invention. Each blade 74 has an arcuate L shaped configuration with a sharp edge 76, a blunt edge 78, a top side 79 and a bottom side 77, as shown in FIGS. 4 and 5. Blades 74 are mounted upon hub 72 such that the sharp edges 76 of both blades face the same direction. Additionally, blades 74 are mounted upon hub 72 such that the top side 79 of one blade is opposite lid 40 and the top side of the other blade is facing housing 20. It also should be recognized that blades 74 may have shapes other than the arcuate L shaped configuration described herein. Further, it should be recognized that blades 74 on impeller 70 may have dissimilar shapes from one another. Moreover, blades 74 may be formed as an integral unit.

The rotation of impeller 70 such that sharp edges 76 are rotated into the food within container 30 acts to chop the food. The rotation of impeller 70 such that blunt edges 78 are rotated into the food within container 30 acts to grind the food.

Referring to FIG. 4, motor controller 52 is adapted to receive power from an external source through a power cord 54 extending from housing 20. Motor controller 52 is adapted to receive a directional input signal from chop button 24 or from grind button 26 via electrical connection 56. The user activates chop button 24 or grind button 26 to provide the directional input to motor controller 52.

Motor controller 52 is adapted to provide a first output signal to motor 50 via electrical connection 58 corresponding to the directional input signal from chop button 24 or grind button 26. For example, motor 50 is adapted to rotate in a first direction, shown on FIG. 3 by arrow A, in response to the directional input signal from chop button 24. Motor 50 is also adapted to rotate in a second direction, shown on FIG. 3 by arrow B, in response to the user activating grind button 26. Thus, impeller 70 is rotated by motor 50 in direction A, which presents sharp edge 76 of blades 74 to the food within container 30 in response to the user activating chop button 24. Alternately, impeller 70 is rotated by motor 50 in direction B, which presents blunt edge 78 of blades 74 to the food within container 30 in response to the user activating grind button 26.

In an alternate embodiment, motor controller 52 is further adapted to receive a speed input signal from speed control switch 80 via electrical connection 56 and is adapted to provide a speed output signal to motor 50 via electrical connection 58 corresponding to the speed input. Thus, motor controller 52 is capable of controlling motor 50 to rotate impeller 70 at various speeds in both directions, A and B.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A food processor comprising:
    a motor;
    a single impeller rotatably driven by said motor;
    a controller for selectively rotating said motor in a first direction and a second direction,
        wherein said impeller includes at least one blade having a sharp edge for chopping foodstuff when rotated in said first direction and a blunt edge for grinding foodstuff when rotated in said second direction.

2. The food processor of claim 1, wherein said controller selectively rotates said motor at more than one speed.

3. The food processor of claim 2, further comprising means for controlling said controller to change the speed of said motor.

4. The food processor of claim 3, wherein said speed controlling means is a switch.

5. The food processor of claim 4, wherein said motor controller rotates said motor at various speeds in response to said switch.

6. The food processor of claim 1, wherein said impeller includes two blades.

7. The food processor of claim 6, wherein said blades are an integral unit.

8. The food processor of claim 6, wherein said sharp edges face the same direction.

9. The food processor of claim 8, wherein the top side of one of said blades faces down and the top side of the other of said blades faces up.

10. The food processor of claim 1, further comprising means for changing the direction of rotation of said motor.

11. The food processor of claim 10, wherein said directional controlling means is a pair of buttons.

12. The food processor of claim 11, wherein said motor controller rotates said motor in said first direction in response to one of said buttons and rotates said motor in said second direction in response to the other of said buttons.

13. The food processor of claim 12, wherein said sharp edges face said first direction.

14. A food processor comprising:
    a motor housing having a motor and a controller;
    a shaft rotatably driven by said motor and extending from said housing for receipt of an impeller, said impeller rotating in response to the rotation of said shaft;
    means for rotating said impeller at various speeds in either said first direction or said second direction,
        wherein said impeller includes at least one blade having a sharp edge for chopping foodstuff when rotated in said first direction and a blunt edge for grinding foodstuff when rotated in said second direction.

15. The food processor of claim 14, wherein said impeller includes two blades.

16. The food processor of claim 15, wherein said sharp edges face the same direction.

17. The food processor of claim 16, wherein the top side of one of said blades faces down and the top side of the other of said blades faces up.

18. The food processor of claim 14, wherein said controller is a pair of buttons and said speed changing means is a switch.

19. The food processor of claim 18, wherein said controller rotates said motor in said first direction in response to one of said buttons and rotates said motor in said second direction in response to the other of said buttons.

20. The food processor of claim 19, wherein said sharp edges face said first direction.

21. The food processor of claim 18, wherein said controller rotates said motor at a first speed in response to said switch being in a first position and rotates said motor at a second speed in response to said switch being in a second position.

* * * * *